(12) United States Patent
Keller

(10) Patent No.: US 7,894,492 B2
(45) Date of Patent: *Feb. 22, 2011

(54) PROGRAMMABLE SONET FRAMING

(76) Inventor: Richard B. Keller, 13917 SE. 30th St., #C, Vancouver, WA (US) 98983

(*) Notice: Subject to any disclaimer, the term of this patent is extended or adjusted under 35 U.S.C. 154(b) by 1177 days.

This patent is subject to a terminal disclaimer.

(21) Appl. No.: 11/480,772

(22) Filed: Jul. 3, 2006

(65) Prior Publication Data

US 2007/0008965 A1 Jan. 11, 2007

Related U.S. Application Data

(63) Continuation of application No. 09/918,896, filed on Jul. 30, 2001, now Pat. No. 7,075,953.

(51) Int. Cl.
*H04J 3/02* (2006.01)
(52) U.S. Cl. ........................... 370/539; 370/907
(58) Field of Classification Search .......... 370/232, 370/252, 254, 358, 376, 465, 535, 536, 539, 370/541, 907; 398/59; 725/109
See application file for complete search history.

(56) References Cited

U.S. PATENT DOCUMENTS

| | | | |
|---|---|---|---|
| 5,040,170 A | 8/1991 | Upp et al. | |
| 5,251,204 A | 10/1993 | Izawa et al. | |
| 5,274,768 A | 12/1993 | Traw et al. | |
| 5,351,236 A | 9/1994 | Pawelski | |
| 5,355,238 A | 10/1994 | Kight et al. | |
| 5,461,622 A | 10/1995 | Bleickardt et al. | |
| 5,568,486 A | 10/1996 | Huscroft et al. | |
| 5,572,515 A * | 11/1996 | Williamson et al. | 370/252 |
| 5,621,383 A | 4/1997 | Yoshiyama | |
| 5,742,765 A | 4/1998 | Wong et al. | |
| 5,793,770 A | 8/1998 | St. John et al. | |
| 5,838,924 A | 11/1998 | Anderson et al. | |
| 5,841,760 A | 11/1998 | Martin et al. | |

(Continued)

FOREIGN PATENT DOCUMENTS

EP 0559091 9/1993

(Continued)

OTHER PUBLICATIONS

Gupta et al., "Reconfigurable ATM Transmitter/Receiver Implementation," Electronics Letters, Nov. 25, 1993, pp. 2139-2140, vol. 29, No. 24.

(Continued)

*Primary Examiner*—Ricky Ngo
*Assistant Examiner*—Phuongchau B Nguyen
(74) *Attorney, Agent, or Firm*—Schwabe, Williamson & Wyatt, P.C.

(57) ABSTRACT

A synchronous optical network (SONET) framer includes a frame dimension unit and a programming interface. The frame dimension unit can be programmed with a frame dimension through the programming interface. The SONET framer converts a data stream to and/or from a frame format based on the frame dimension programmed into the frame dimension unit. For instance, in various embodiments, a SONET framer can be programmed to support a variety of SONET frame sizes and to provide a number of testing and design advantages.

38 Claims, 5 Drawing Sheets

U.S. PATENT DOCUMENTS

| | | | |
|---|---|---|---|
| 5,857,092 A | 1/1999 | Nakamura et al. | |
| 5,867,484 A | 2/1999 | Shaunfield | |
| 5,907,682 A * | 5/1999 | Miyazawa | 709/230 |
| 5,923,653 A | 7/1999 | Denton | |
| 5,983,365 A | 11/1999 | Van De Pol et al. | |
| 6,034,947 A | 3/2000 | Yoshida et al. | |
| 6,041,066 A | 3/2000 | Meki et al. | |
| 6,075,788 A | 6/2000 | Vogel | |
| 6,118,795 A | 9/2000 | Fukunaga et al. | |
| 6,122,281 A | 9/2000 | Donovan et al. | |
| 6,188,692 B1 | 2/2001 | Huscroft et al. | |
| 6,389,036 B1 | 5/2002 | Stewart et al. | |
| 6,400,730 B1 | 6/2002 | Latif et al. | |
| 6,414,966 B1 | 7/2002 | Kulkami et al. | |
| 6,430,201 B1 | 8/2002 | Azizoglu et al. | |
| 6,434,562 B1 | 8/2002 | Pennywitt et al. | |
| 6,436,562 B1 | 8/2002 | Pennywitt et al. | |
| 6,493,359 B1 | 12/2002 | Sorgi et al. | |
| 6,556,593 B1 | 4/2003 | Herkersdorf et al. | |
| 6,580,731 B1 | 6/2003 | Denton | |
| 6,654,802 B1 | 11/2003 | Oliva et al. | |
| 6,690,682 B1 | 2/2004 | Giaretta et al. | |
| 6,839,352 B1 | 1/2005 | Vogel | |
| 6,839,871 B2 | 1/2005 | Patel et al. | |
| 6,854,031 B1 | 2/2005 | Ouellet et al. | |
| 6,892,172 B1 | 5/2005 | Singh et al. | |
| 6,937,625 B2 | 8/2005 | Colombo et al. | |
| 7,002,967 B2 | 2/2006 | Denton et al. | |
| 7,016,357 B1 | 3/2006 | Wellbaum et al. | |
| 7,075,953 B2 * | 7/2006 | Keller | 370/539 |
| 7,158,535 B1 | 1/2007 | Bendak et al. | |
| 7,463,656 B2 * | 12/2008 | Denton | 370/539 |
| 2001/0043603 A1 | 11/2001 | Yu | |
| 2001/0053160 A1 | 12/2001 | Dally | |
| 2002/0009100 A1 | 1/2002 | Raghavan et al. | |
| 2002/0122386 A1 | 9/2002 | Calvignac et al. | |
| 2002/0141456 A1 | 10/2002 | Wang et al. | |
| 2002/0176131 A1 | 11/2002 | Walters et al. | |
| 2003/0110197 A1 | 6/2003 | Hansen et al. | |
| 2003/0193962 A1 | 10/2003 | Primrose et al. | |
| 2004/0131090 A1 * | 7/2004 | Clauberg | 370/540 |
| 2005/0238028 A1 * | 10/2005 | Keller | 370/395.51 |
| 2006/0133411 A1 | 6/2006 | Denton et al. | |
| 2006/0212780 A1 | 9/2006 | Ohira et al. | |
| 2007/0047554 A1 | 3/2007 | Denton | |

FOREIGN PATENT DOCUMENTS

| | | |
|---|---|---|
| EP | 0794626 | 9/1997 |
| EP | 883323 | 12/1998 |
| EP | 1083692 | 3/2001 |
| JP | 10093536 | 4/1998 |
| WO | 9205644 | 4/1992 |

OTHER PUBLICATIONS

Trost, "Bit Error Rate Monitoring for a SONET/SDH Framer," West Bay Semiconductor, Apr. 1, 2001, 30 pages.

Iqbal et al., "A 2.5 Gb/s SONET Datalink with STS-12c Inputs and HIPPI Interface for Gigabit Computer Networks," IEEE 1992, pp. 1196-1200.

Seetharam et al., "A Parallel SONET Scrambler/Descrambler Architecture," IEEE, 1993, pp. 2011-2014.

Chao et al., "A 140 Mbit/s CMOS LSI Framer Chip for a Broad-Band ISDN Local Access System," IEEE, Feb. 1988, pp. 133-144, vol. 23, No. 1.

Koziotis et al., "0.6 um CMOS, 622/155 Mbit/s ATM-SDH/ SONET Framer IC," Electronics Letters, Oct. 14, 1999, pp. 1833-1834, vol. 35, No. 21.

Notice of Allowance, issued in U.S. Appl. No. 09/918,896, mailed Dec. 30, 2004.

Office Action, issued in U.S. Appl. No. 11/169,954, mailed Oct. 7, 2008.

International Search Report, issued in PCT Application No. PCT/US2002/24289, mailed Nov. 12, 2002.

Office Action, issued in U.S. Appl. No. 11/169,954, mailed May 28, 2009.

Office Action, issued in U.S. Appl. No. 11/169,954, mailed Sep. 25, 2009.

Office Action, issued in U.S. Appl. No. 10/428,167, mailed May 17, 2007.

Office Action, issued in U.S. Appl. No. 10/428,167, mailed Oct. 17, 2007.

Office Action, issued in U.S. Appl. No. 10/428,167, mailed Feb. 13, 2008.

Notice of Allowance, issued in U.S. Appl. No. 10/428,167, mailed Aug. 11, 2008.

Office Action, issued in U.S. Appl. No. 09/860,367, mailed Aug. 15, 2002.

Office Action, issued in U.S. Appl. No. 09/860,367, mailed Feb. 24, 2003.

Office Action, issued in U.S. Appl. No. 11/513,751, mailed Mar. 20, 2009.

International Search Report, issued in PCT Application No. PCT/US2002/15594, mailed Aug. 21, 2002.

Office Action, issued in U.S. Appl. No. 11/513,751, mailed Oct. 14, 2009.

Hari et al., "A Reliable and Scalable Striping Protocol," Conference Proceedings on Applications, Technologies, Architectures, and Protocols for Computer Communications, Oct. 1996, pp. 131-141.

Hari et al., "An Architecture for Packet-Striping Protocols," ACM Transactions on Computer Systems, Nov. 1999, vol. 17, No. 4, pp. 249-287.

Hutchins et al., "A Novel Approach to Mobility Management," ACM SIGCOMM Computer Communications Review, Jan. 1999, vol. 29, Iss. 1, pp. 89-96.

Iren et al., "The Transport Layer: Tutorial and Survey," ACM Computing Surveys, Dec. 1999, vol. 31, No. 4, pp. 360-405.

* cited by examiner

ADDITIONAL OVERHEAD
130

OVERHEAD COLUMNS
110

PAYLOAD COLUMNS
120

| 1,1 | 1,2 | 1,3 | 1,4 | ... | 1,90 |
|-----|-----|-----|-----|-----|------|
| 2,1 | 2,2 | 2,3 | 2,4 | ... | 2,90 |
| 3,1 | 3,2 | 3,3 | 3,4 | ... | 3,90 |
| 4,1 | 4,2 | 4,3 | 4,4 | ... | 4,90 |
| 5,1 | 5,2 | 5,3 | 5,4 | ... | 5,90 |
| 6,1 | 6,2 | 6,3 | 6,4 | ... | 6,90 |
| 7,1 | 7,2 | 7,3 | 7,4 | ... | 7,90 |
| 8,1 | 8,2 | 8,3 | 8,4 | ... | 8,90 |
| 9,1 | 9,2 | 9,3 | 9,4 | ... | 9,90 |

FIG. 1

PROGRAMMABLE SONET FRAMING

CROSS-REFERENCE TO RELATED APPLICATIONS

The application is a continuation of U.S. patent application Ser. No. 09/918,986, filed Jul. 30, 2001, by Keller, and entitled "PROGRAMMABLE SONET FRAMING," which issued on Jul. 11, 2006 as U.S. Pat. No. 7,075,953.

FIELD OF THE INVENTION

The present invention pertains to the field of networking. More particularly, this invention relates to programmably framing Synchronous Optical Network (SONET) frames.

BACKGROUND

Fiber optics have provided a substantial increase in the volume of data that networks can carry. Synchronous Optical Network (SONET) is a standard that defines data transmissions over fiber optics. SONET defines a number of different data rates for different levels of service. A typical SONET network can carry from about 52 megabits per second up to about 10 gigabits per second over a single optical fiber. In comparison, a typical analog modem operating at maximum efficiency can achieve a mere 56 Kilobits per second. At the 10 gigabit SONET rate, a single optical fiber can carry enough data to handle well over 100,000 simultaneous voice calls. SONET networks are likely to carry even larger volumes of data in the future.

Data in a SONET network is often processed in electrical form. For instance, a SONET network may be made up of a web of optical fibers interspersed with routers and/or switches. The routers and/or switches determine which path data should take to reach a particular destination. Optical data is usually converted to electrical form before being processed by a router or switch. If a router or switch determines that data is to continue on through the SONET network, the data is converted back to optical form before being passed on to the next router or switch. Data may pass through many routers and/or switches between a source and a destination.

Data is also converted to and/or from optical form at the edges of a SONET network. For example, routers and/or switches may connect one or more electrical networks to one or more SONET networks. Data may start out in electrical form to travel over wires making up an electrical network, get converted by routers and/or switches back and forth between electrical and optical form while traveling among various SONET networks and/or additional electrical networks, and eventually travel in electrical form over wires leading to a destination.

Each time data enters or leaves a SONET network, or gets processed in electrical form within a SONET network, the data is usually converted to/from a particular SONET frame format. The frame format depends on the physical characteristics of the particular SONET medium. Different media can support different sizes of SONET frames, and therefore different volumes of data.

In the past, the electrical hardware used to convert data to and/or from SONET frames has been matched to the corresponding physical SONET medium. That is, if the SONET medium supports 52 megabits per second, a framer is used that converts frames at 52 megabits per second. If the SONET medium supports 10 gigabits per second, a framer is used that converts frames at 10 gigabits per second. If, for any reason, a different data rate is needed or desired, new hardware is required, often requiring considerable additional expense.

BRIEF DESCRIPTION OF THE DRAWINGS

Examples of the present invention are illustrated in the accompanying drawings. The accompanying drawings, however, do not limit the scope of the present invention. Similar references in the drawings indicate similar elements.

FIG. 1 illustrates one embodiment of a single-plane SONET frame.

DETAILED DESCRIPTION

Figure 2:
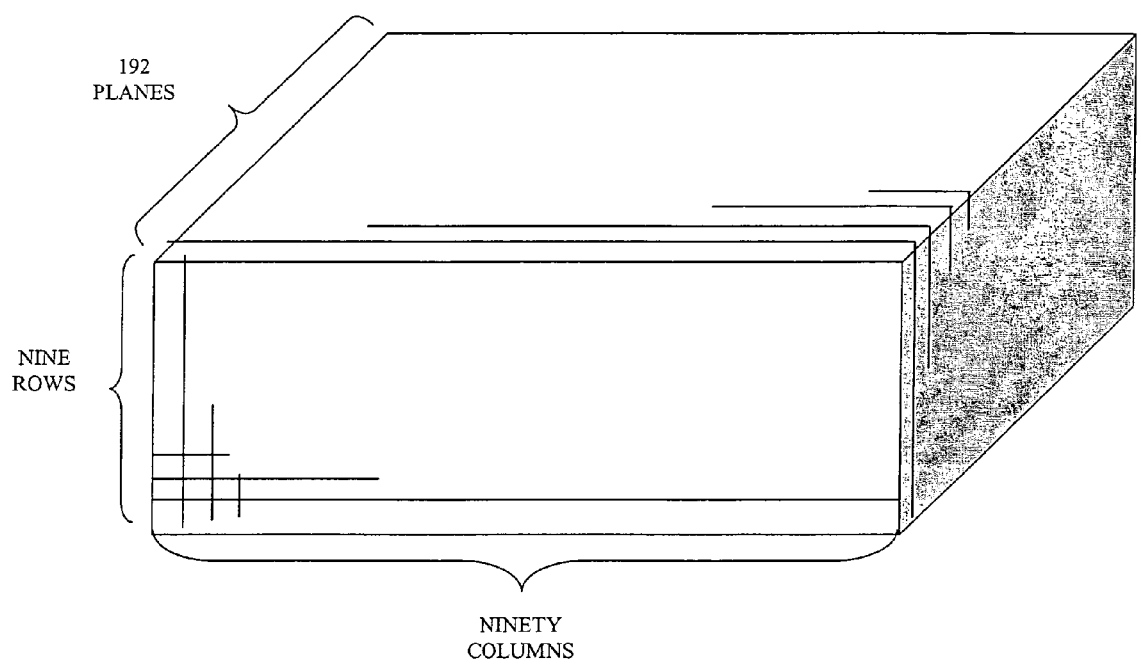
FIG. 2 illustrates one embodiment of a composite SONET frame having 192 planes.

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

The present invention provides the flexibility to program the size of a Synchronous Optical Network (SONET) frame. In one embodiment, hardware used to convert a data stream to and/or from SONET frames uses counters to count the number of byte positions in a SONET frame. The present invention provides programming access to one or more of the counters so that the number of bytes per frame can be changed.

By programming the size of SONET frames, a variety of standard SONET data rates may be supported by a single SONET framer. For instance, if a data port on a router is originally coupled to a SONET medium that supports one data rate, and the SONET medium is later changed to a different data rate, it may be possible to reprogram the SONET framer to support the new data rate, saving the cost of replacing the SONET framer with new hardware. A user may even be able to reprogram the framer himself or herself, avoiding the cost and inconvenience of a service call. Furthermore, a supplier may be able to support multiple data rates with one piece of hardware, eliminating the cost and inconvenience of stocking different hardware for each data rate.

Programmable frame sizes can also be used to improve a variety of testing and hardware development situations. For instance, high speed SONET hardware tends to be fairly complex. Designs are usually created and tested in a simulation environment prior to costly fabrication. At the 10 gigabit data rate, a single SONET frame includes about 155 thousand bytes. A software simulator may take hours to simulate the framing of a single frame of data. Once the design of the framer has been tested and verified, continuing to simulate the framing of huge frames of data may be unnecessary for the verification of other components of the design. By programming the framer for a smaller frame size, the simulation time needed to design and test the other components can be substantially reduced.

Programmable frame size can similarly improve the performance of a hardware emulator. A hardware emulator is made up of hardware elements that can be programmed to represent the functionality of circuit designs. For instance, a circuit design can be written in a hardware description language, such as Verilog, and loaded into an emulator to model the design. Hardware emulators tend to be much faster than software simulators. But, as fast as hardware emulators are, the programmable hardware elements tend to be less efficient than actual SONET hardware. At a high SONET data rate, such as the 10 gigabit rate, even an emulator may be bogged down by the volume of data, and may benefit from smaller frame sizes.

Programmable frame size can be helpful when testing the actual hardware of a SONET framer as well. For instance, a logic analyzer can be used to capture and analyze data from the actual hardware. At the 10 gigabit rate, the volume of data in a single frame is so large that a logic analyzer may only be able to capture part of a single frame, making it very difficult to test the functionality of the hardware across frame boundaries. By programming the framer for smaller frame sizes, the logic analyzer may be able to capture and analyze several frames of data, exposing the functionality at frame boundaries and allowing the framer to cycle through more operational states in a shorter period of time.

Programmable frame size can also be helpful when developing hardware and/or software surrounding a SONET framer. For instance, if a new hardware component for processing SONET overhead is needed, and the overhead processor needs to operate on the same data stream as the SONET framer, it may be desirable to simulate or emulate the overhead processor and couple the modeled design to the actual SONET framer. Any number of simulator or emulator interfaces can be used. The simulator or emulator may not be fast enough to handle the maximum data rate supported by the framer. In which case, the framer could be programmed to a lower data rate to match the speed of the simulator or emulator.

FIG. 1 illustrates one embodiment of a single-plane SONET frame. The SONET frame is 9 rows high by 90 columns wide. Each entry in the frame is an 8 bit byte. Transmitting the data in a frame begins at row 1, column 1 and ends at row 9, column 90. Bits of data are transmitted serially, one at a time, as pulses of light in an optical fiber. The frame is read across rows from left to right, one row at a time.

Frames are written in the illustrated format so that overhead bytes and payload bytes are easily identified. Bytes in the first three columns, columns 110, are reserved for overhead bytes, and bytes in the remaining columns, columns 120, are payload bytes. When the data is transmitted serially, the first three bytes are overhead, the next 87 bytes are payload, the next three bytes are overhead, the next 87 bytes are payload, and so on.

Some additional byte positions in one column among the payload bytes may also be used for overhead. In the illustrated embodiment, the additional overhead bytes 130 are in column 4 of the payload section. In alternate embodiments, the additional overhead bytes can be in any column in the payload section, and may not occupy an entire column. All of the overhead bytes, including those in columns 110, are used to manage various operations in a SONET network, such as routing, error checking, and the like.

FIG. 2 illustrates one embodiment of a composite SONET frame. The composite frame is comprised of multiple planes identical to the single-plane frame illustrated in FIG. 1. That is, each plane in the composite frame includes 9 rows and 90 columns, with up to 36 bytes of overhead. In the illustrated embodiment, there are 192 planes in the frame.

The composite frame is read from front to back, and then left to right. That is, the byte in row 1, column 1 is read from each plane, starting with plane 1 and ending with plane 192. Then, the bytes in row 1, column 2 are read from all 192 planes, followed by the bytes in row 1, column 3 from all 192 planes, and so on. As the composite frame is read serially, the data stream comprises 9 iterations (one iteration for each row) of 576 bytes of overhead (from 192 planes times 3 overhead bytes per row) followed by 16704 bytes of payload (from 192 planes times 87 payload bytes per row). Somewhere among each 16704 bytes of payload there are also up to 192 continuous bytes of payload that are used for overhead, depending on the logical construction of the composite frame.

The composite frame of FIG. 2, like the single-plane frame of FIG. 1, is a single unit in the SONET network. That is, no matter how many planes a frame has, one frame is transmitted every 125 micro seconds, or 8000 times per second. By increasing the size of a frame by adding more planes, the data rate increases. For instance, the data rate for the single-plane frame of FIG. 1 is 810 bytes per frame times 8 bits per byte times 8000 frames per second, which equals 51.84 Megabits per second. For the 192-plane frame of FIG. 2, the data rate is 810 bytes per plane times 192 planes per frame times 8 bits per byte times 8000 frames per second, which equals 9.95328 Gigabits per second.

The frame format for the 192 plane frame of FIG. 2 is referred to as optical carrier level 192 (OC-192). The optical carrier level corresponds to the number of planes in the frame. OC-192 is a standard SONET frame size that provides the 10 gigabit data rate. Other standard SONET frame sizes that provide lower data rates include OC-3 (156 megabits/second), OC-12 (625 megabits/second), and OC-48 (2.5 gigabits/second).

A SONET framer converts a data stream to a stream of SONET frames by filling available payload bytes locations with data bytes from the data stream and filling byte locations reserved for overhead with overhead bytes generated by other components. A SONET framer recovers a data stream in the opposite way.

In one embodiment, a SONET framer includes three counters, a row counter, a column counter, and a plane counter. The values of the counters define the current byte position in a frame, and depending on the byte position, the framer knows whether a byte is payload or overhead.

Figure 3:
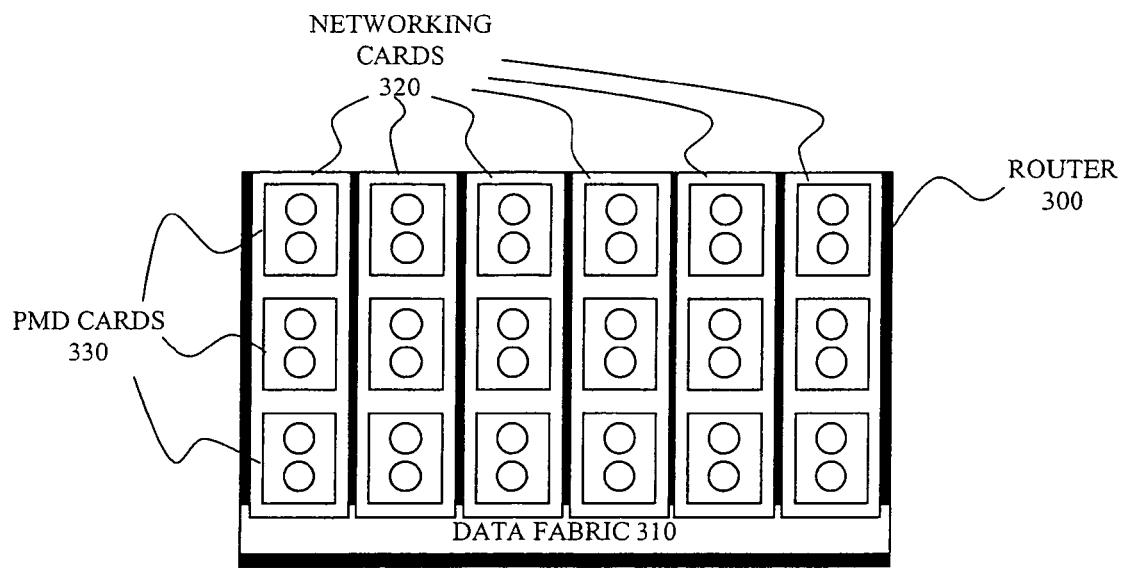
FIG. 3 illustrates one embodiment of a router.

FIG. 3 illustrates one embodiment of a router 300 that can take advantage of the present invention. Router 300 includes a number of networking cards 320. In the illustrated embodiment, each network card includes three physical medium dependency (PMD) cards 330. Each PMD card 330 has input/output ports to couple the router 300 to a physical network medium. PMD cards 330 may couple the router to any number of electrical wire networking media, wireless networking media, and, of course, optical fiber media for SONET networking. The optical fiber media may include fibers that support a variety of optical carrier levels, such as OC-3, OC-12, OC-48, and OC-192.

Router 300 also includes data fabric 310. As data is received from a physical networking media, the corresponding PMD card 330 and networking card 320 convert the data to a format that is usable by data fabric 310. Data fabric 310 then directs the data to one of the various output ports. A networking card 320 and PMD card 330 corresponding to the selected output port convert the data to a format supported by the physical networking medium.

When physical network media are added, deleted, or replaced, the networking cards 320 and PMD cards 330 are changed to accommodate the physical media. For changes in SONET optical carrier level, the present invention makes it possible to change the card by simply reprogramming the networking card 320 to support the new physical media rather than replacing the entire card.

Except for the teachings of the present invention, router 300 is tended to represent a wide variety of networking devices known in the art. Alternate embodiments may include any number of input/output ports dispersed among any configuration of networking cards and PMD cards. In alternate embodiments, the present invention may similarly be used with any number of SONET devices, such as signal regenerators, switches, and the like.

Figure 4:
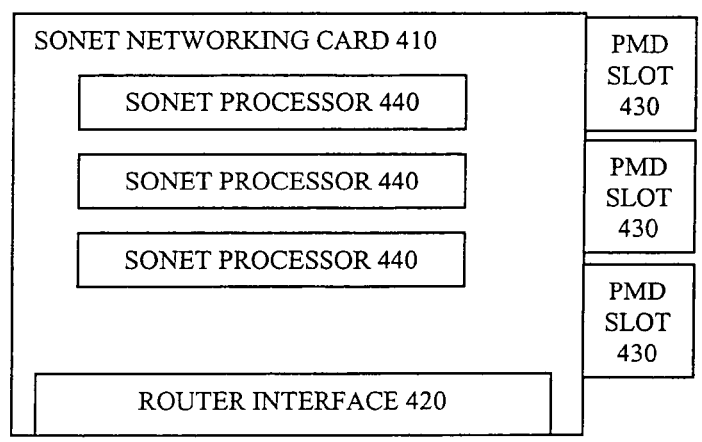
FIG. 4 illustrates one embodiment of a SONET networking card.

FIG. 4 illustrates one embodiment of a SONET networking card 410 in more detail. The networking card 420 includes a router interface 420, and three pairs of SONET processors 440 and corresponding PMD slots 430 to couple the router to three SONET networks. In the past, if any one of the SONET networks changed, it would be necessary to replace the entire card, potentially at great expense. However, with the present invention, a single card can be programmed to support several different SONET physical media. Rather than replacing the entire card when one physical medium changes, the corresponding SONET processor 440 can be reprogrammed to support the new medium.

Alternate embodiments of SONET networking cards may include any number of PMD card slots. Generally, the more slots a networking card provides, the more expensive the card is to replace, making reprogrammability that much more desirable.

Figure 5:
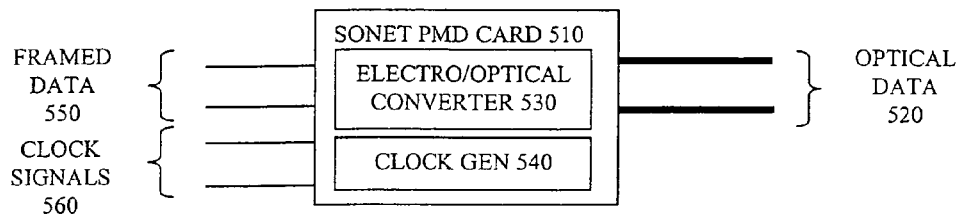
FIG. 5 illustrates one embodiment of a SONET PMD card.

FIG. 5 illustrates one embodiment of a SONET PMD card 510 in more detail. PMD card 510 is intended to represent a wide variety of such devices known in the art. Such devices tend to be relatively simple and inexpensive. In the illustrated embodiment, the card includes an electro/optical converter 530 and a clock generator 540. Electro/optical converter 530 converts framed data 550 to and from optical data 520. Converter 530 is "matched" to the physical medium of the network. That is, SONET data is transmitted synchronously, at a constant data rate. Converter 530 sends and receives data at both the electrical and optical sides according to the data rate dictated by the optical carrier level of the physical medium.

Clock generator 540 generates clock signals 560 for internal use and for the corresponding SONET processor. In one embodiment, clock signals 560 include a frame synchronization signal and a data clock. SONET frames are sent at a constant synchronous rate, 8 kHz, no matter what the optical carrier rate is. In which case, a universal frame synchronization signal is provided throughout a SONET network. Clock generator 540 passes the frame synchronization signal to the SONET processor and derives the data clock from the frame synchronization signal. The data clock is dictated by the data rate of the optical carrier level of the physical network medium. Since SONET frames are built one byte at a time, the data clock is usually derived such that it cycles once for each byte of data. In which case, the data clock for OC-192 would be approximately 1.2 gigahertz.

Figure 6:
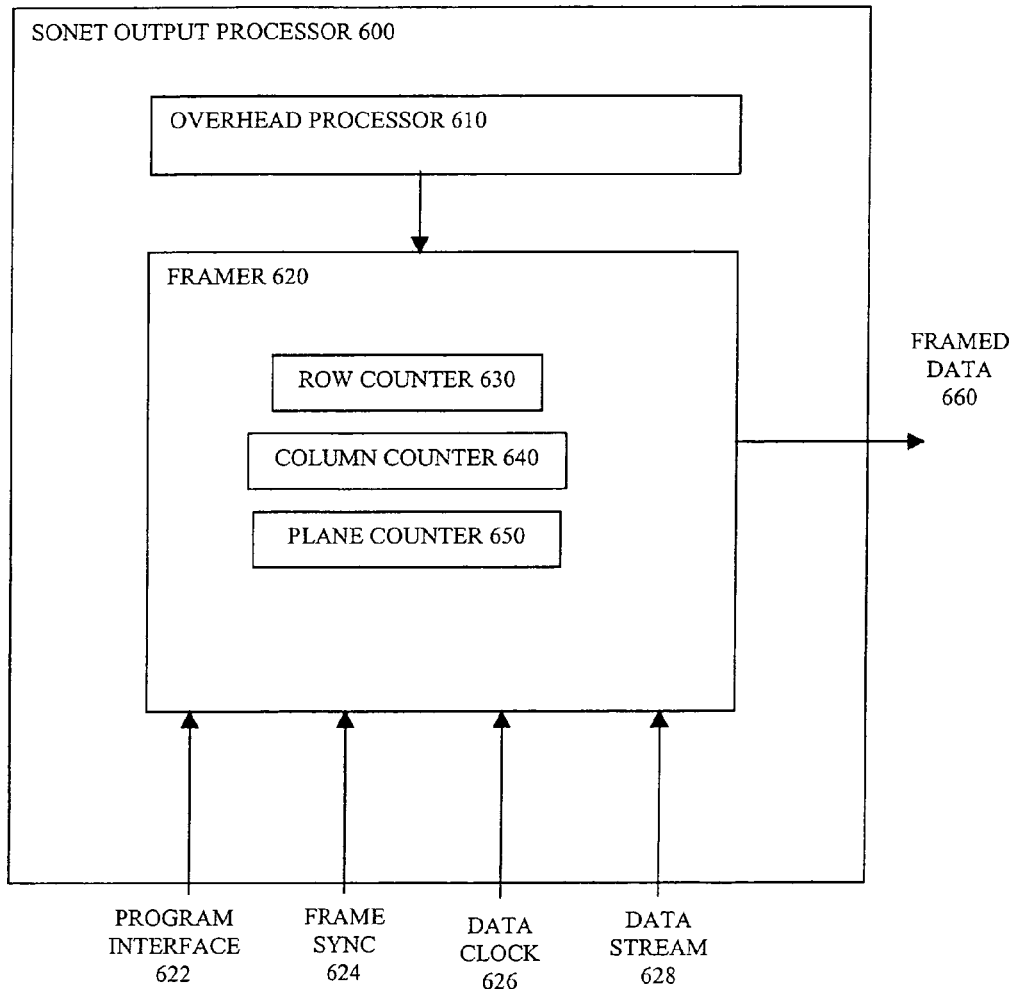
FIG. 6 illustrates one embodiment of a SONET output processor.

FIG. 6 illustrates one embodiment of a SONET processor, processor 600, for processing an output data stream. The same processing happens in reverse for an input data stream. In the illustrated embodiment, processor 600 includes overhead processor 610 and framer 620. Overhead processor 610 performs a wide variety of SONET processing known in the art. Framer 620 combines data stream 628 from the router with various overhead bytes from overhead processor 610 to provide framed data 660 to the PMD card at the constant data rate dictated by the optical carrier level of the SONET medium.

In order to provide framed data 660 at the dictated rate, framer 620 receives a frame sync signal 624 and a data clock 626. Frame sync 624 may be received from the PMD card, from some other source, or, in an alternate embodiment, may be generated internally. Similarly, data clock 626 may be received from the PMD card, from some other source, or, in an alternate embodiment, may be generated internally.

Framer 620 starts a new frame for each frame sync signal 624. That is, row counter 630, column counter 640, and plane counter 650 all start from one. Plane counter 650 is incremented for each clock cycle of data clock 626. Column counter 640 is incremented each time plane counter 650 reaches its maximum value and returns to one. Row counter 630 is incremented each time column counter 640 reaches its maximum value and returns to one. Depending on the byte position in the SONET frame indicated by the values of the three counters, framer 620 loads either a byte from data stream 628 or a byte of overhead into framed data 660 for each clock cycle of data clock 626.

Except for the teachings of the present invention, framer 620 represents any of a number of such devices known in the art. In alternate embodiments, any number of techniques can be used to identify byte locations in frames. For instance, one alternate approach uses two counters rather than three, and represents byte locations in SONET frames in two dimensions.

According to the teachings of the present invention, one or more of the counters within framer 620 are programmable. Inventive framer 620 also includes program interface 622 to program the programmable counter(s). Program interface 620 may be, for instance, a data bus coupled to a processor. In which case, software can be used to program the counter(s) by writing to particular address spaces corresponding to the counter(s). Alternately, program interface 620 may represent any number of interfaces, including one or more dip switches or the like.

Where plane counter 650 is programmable, framer 620 can be programmed to support multiple standard SONET data rates. For instance, in one embodiment, the default setting for plane counter 650 is 192, to support OC-192. However, by reprogramming plane counter 650 to 48, 12, or 3, the SONET processor 600 can support OC-48, OC-12, or OC-3, respectively. Row counter 630 and column counter 640 do not need to be programmable to support any of these standard data rates because the plane dimensions are 9 rows by 90 columns for each standard data rate.

If the framer is only programmable to support four different standard SONET data rates, program interface 622 could comprise a pair of dip switches to represent the four possible modes of operation. Alternately, software could write a two bit register value to the framer to select one of the four possible modes of operation. Of course, any number of approaches can be used for program interface 622, including directly writing the desired maximum number of planes to the programmable plane counter.

Under certain circumstances, it can be useful to program framer 620 to generate non-standard frames. In which case, plane counter 650 may be programmed to a non-standard number of planes. Furthermore, row counter 630 and/or column counter 640 may also be programmable to provide non-standard plane dimensions. For instance, each time the number of rows is reduced by one, the frame size is reduced, and therefore the volume of data per frame is reduced, by almost 17 thousand bytes. Reducing the volume of data may be helpful when testing or designing various components. However, reducing the number of rows may cut off some needed overhead bytes. In which case, it may be more desirable to keep the number of rows, but reduce the number of columns. By reducing the maximum number of columns, the payload portion of a frame can be trimmed without loosing overhead bytes. In other situations, it may be beneficial to change any combination of rows, columns, and planes.

Figure 7:
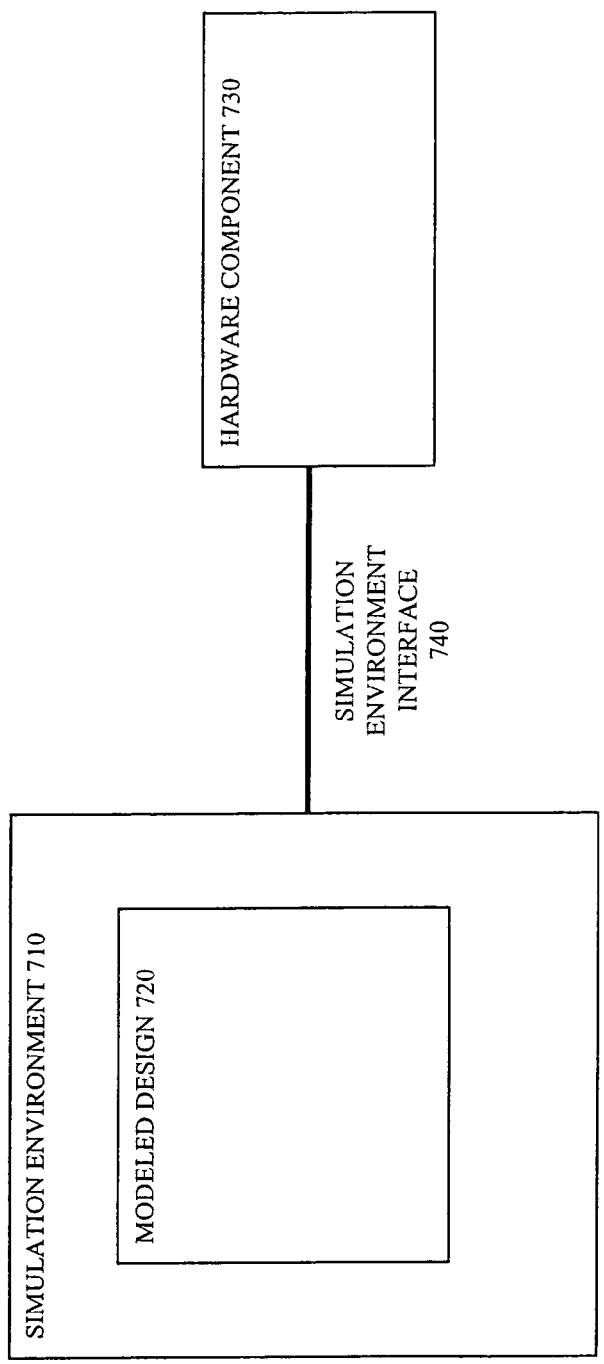
FIG. 7 illustrates one embodiment of simulation environment.
Figure 8:
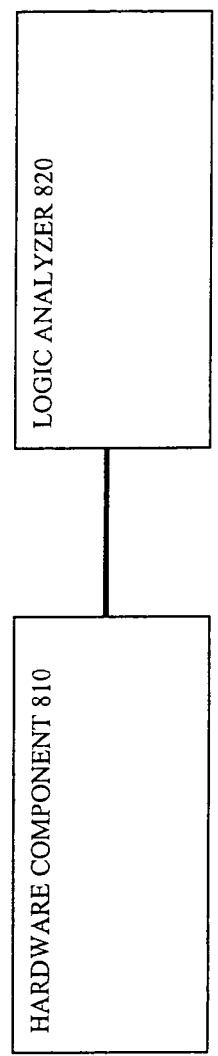
FIG. 8 illustrates one embodiment of hardware testing.

FIGS. 7 and 8 illustrate some situations in which it can be useful to reprogram the frame size to various sizes, including non-standard frame sizes. In FIG. 7, simulation environment 710 is used to model a circuit design 720. Simulation environment may include software simulation, hardware emulation, and the like. If circuit design 720 models the framing of a large SONET frame, it may take an excessively long time to simulate. For instance, in software simulation, an OC-192 frame may several hours to simulate. Once framing has been tested and verified, it may be possible to speed up the testing and verification of other components in design 720 by programming the frame size to reduce the volume of data being modeled.

Furthermore, if design 720 represents components that interact with a SONET framer, it may be beneficial to model the components in conjunction with the actual SONET framer hardware component 730 through simulation environment interface 740. Any number of co-simulation environments can be used to couple simulation environment 710 to hardware component 730. Again, it may be possible to speed up the testing and verification of design 720 by programming the frame size to reduce the volume of data being modeled.

In FIG. 8, hardware component 810 includes a SONET framer. The hardware component is analyzed by logic analyzer 820. That is, logic analyzer 820 provides various test vectors to hardware component 810 to cycle the hardware through various operational states. Logic analyzer captures and analyzes the hardware responses to the test vectors. At the OC-192 data rate, the logic analyzer may only be able to capture and analyze a portion of a single frame. By reducing the frame size, logic analyzer 820 may be able to capture data from multiple frames, thereby cycling through more operational states more efficiently and in less time.

In one embodiment, the present invention, as described above, is implemented as part of an application specific integrated circuit (ASIC) for SONET protocol processing. The software described above for programming frame sizes could be implemented in code running on an embedded controller, an external processor, or the like, as will be comprehended by a person skilled in the art. In another example, field programmable gate arrays (FPGAs) or static programmable gate arrays (SPGA) could be used to implement one or more functions of the present invention. In yet another example, a combination of hardware and software could be used to implement one or more functions of the present invention.

Thus, programmable SONET framing is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. An apparatus, comprising:
   a frame dimension unit, said frame dimension unit being programmable through a programming interface based, at least in part, on a frame dimension received through said programming interface;
   an optical network framer coupled to the frame dimension unit and configured to convert a data stream to and/or from a frame format based, at least in part, on said frame dimension programmed into the frame dimension unit, wherein the apparatus is configured to be coupled to one or more physical media dependency (PMD) devices associated with the optical network framer and coupled to a physical networking medium to transmit and/or receive data to and/or from the physical networking medium.

2. The apparatus of claim 1, wherein the frame dimension unit comprises a plane counter, a row counter, and a column counter.

3. The apparatus of claim 2, wherein at least one of the plane counter, the row counter, or the column counter is programmable.

4. The apparatus of claim 1, wherein the programming interface comprises at least one data bus.

5. The apparatus of claim 1, wherein the programming interface comprises one or more dip switches.

6. The apparatus of claim 1, wherein the frame dimension comprises a programmable number of planes per frame.

7. The apparatus of claim 6, wherein the optical network framer is configured to transmit and/or receive data at a plurality of standard data rates associated with particular values of the programmable number of planes.

8. The apparatus of claim 6, wherein the optical network framer is configured to transmit and/or receive data over a range of data rates associated with particular values of the programmable number of planes.

9. The apparatus of claim 1, wherein the frame dimension comprises at least one parameter selected from the group consisting of a programmable number of rows per frame and a programmable number of columns per frame.

10. The apparatus of claim 9, wherein the optical network framer is configured to transmit and/or receive data over a range of data rates associated with at least one of the programmable number of rows and the programmable number of columns.

11. The apparatus of claim 1, further comprising:
    a simulation environment interface coupled to the optical network framer, and configured to couple the apparatus to a simulation environment, said frame dimension to be programmed to achieve a data rate supported by the simulation environment.

12. The apparatus of claim 1, wherein the apparatus comprises a simulation environment coupled to the optical network framer, and wherein the frame dimension is programmed to achieve a data rate supported by the simulation environment.

13. The apparatus of claim 12, wherein the simulation environment comprises at least one of a software simulator and a hardware emulator.

14. The apparatus of claim 12, wherein the simulation environment is configured to be programmed to achieve a volume of data per frame supported by a logic analyzer.

15. The apparatus of claim 1, further comprising a logic analyzer interface coupled to optical network framer, and configured to couple the apparatus to a logic analyzer, the frame dimension configured to be programmed to achieve a volume of data per frame supported by the logic analyzer.

16. A method, comprising:
   programming by an optical networking card, a frame dimension unit with a frame dimension through a programming interface of an optical network framer; and
   converting by the optical networking card, a data stream to and/or from a frame format with the optical network framer based on the frame dimension programmed into the frame dimension unit; and
   transmitting by the optical networking card, the data stream to a physical networking medium via a physical media dependency (PMD) device, wherein the PMD device is associated with the optical network framer and configured to be coupled to the physical networking medium, and wherein the optical networking card is one from a plurality of optical networking cards coupled to a data fabric in a router.

17. The method of claim 16, wherein programming the frame dimension unit further comprises setting a number of planes per frame.

18. The method of claim 17, wherein the number of planes is associated with one of a plurality of standard data rates supported by the framer.

19. The method of claim 16, wherein programming the frame dimension unit comprises at least one of:
   setting a number of rows per frame; and
   setting a number of columns per frame.

20. The method of claim 16, wherein the number of rows and/or number of columns are associated with one of a range of data rates supported by the framer.

21. An article of manufacture, comprising:
   a tangible machine readable medium having stored thereon machine executable instructions that in response to execution by a processor of an apparatus, cause the apparatus to perform operations comprising:
   programming a frame dimension unit of the apparatus with a frame dimension through a programming interface of an optical network framer;
   converting a data stream to and/or from a frame format with the framer based, at least in part, on the frame dimension programmed into the frame dimension unit; and
   transmitting the data stream to a physical networking medium via a physical media dependency (PMD) device associated with the optical network framer and configured to be coupled to the physical networking medium.

22. The article of claim 21, wherein programming the frame dimension unit further comprises setting a number of planes per frame.

23. The article of claim 22, wherein the number of planes is associated with one of a plurality of standard data rates supported by the framer.

24. The article of claim 21, wherein programming the frame dimension unit comprises at least one of: setting a number of rows per frame; and setting a number of columns per frame.

25. The article of claim 21, wherein the number of rows and/or number of columns are associated with one of a range of data rates supported by the framer.

26. A router, comprising:
   a plurality of network cards configured to transmit data to and/or receive data from a physical networking medium; and
   a data fabric coupled to the network cards and configured to transmit data between said network cards, wherein one or more of said network cards further comprise:
   one or more physical media dependency (PMD) devices configured to be coupled to said physical networking medium;
   a programming interface;
   a frame dimension unit, said frame dimension unit being programmable through said programming interface based, at least in part, on a frame dimension received through said programming interface; and
   one or more optical network framers associated with said one or more PMD devices, said one or more optical network framers being configured to convert associated data streams to and/or from a frame format based, at least in part, on said frame dimension programmed into the frame dimension unit.

27. The router of claim 26, wherein said one or more of said network cards further comprise one or more overhead processors associated with said one or more optical network framers to provide overhead bytes for insertion into framed data for transmission through associated ones of said PMD devices.

28. The router of claim 26, wherein one or more of said network cards are individually programmable based, at least in part on one or more frame dimensions programmed into one or more associated frame dimension units.

29. The router of claim 26, wherein the frame dimension unit comprises a plane counter, a row counter, and a column counter.

30. The router of claim 29, wherein at least one of the plane counter, the row counter, and the column counter is programmable.

31. The router of claim 26, wherein the frame dimension comprises a programmable number of planes per frame.

32. The router of claim 31, wherein at least one of said one or more framers is configured to transmit and/or receive data at a plurality of standard data rates associated with particular values of the programmable number of planes.

33. The router of claim 31, wherein at least one of said one or more framers is configured to transmit and/or receive data over a range of data rates associated with particular values of the programmable number of planes.

34. The router of claim 26, wherein the frame dimension comprises at least one parameter selected from the group consisting of a programmable number of rows per frame and a programmable number of columns per frame.

35. The router of claim 34, wherein at least one of said one or more framers is configured to transmit and/or receive data over a range of data rates associated with at least one of the programmable number of rows and the programmable number of columns.

36. A network interface card, comprising:
   one or more physical media interfaces configured to interface with one or more physical media devices, the one or more physical media devices configured to couple the network interface card to one or more physical networking media for transmitting data to and/or receiving data from the physical networking media; and an optical networking processor coupled to the one or more physical media interfaces, wherein the optical networking processor is configured to be programmable via a programming interface based at least in part, on a frame dimension received through the programming interface, the optical networking processor including one or more optical networking framers associated with the one or more physical media devices, the one or more optical networking framers being configured to convert associated data streams to and/or from a frame format based, at least in part, on the frame dimension programmed into the optical networking processor, wherein the network interface card is one of a plurality of network interface cards configured to be included in a router and coupled to a data fabric for transmitting data between one or more additional optical networking cards in the router.

37. The network interface card of claim 36, further comprising an overhead processor coupled to the optical networking processor, and configured to provide the one or more optical networking framers with an overhead byte for insertion into an overhead byte location.

38. The network interface card of claim 36, wherein the optical networking processor is configured to convert the associated data streams to and/or from the frame format by filling available payload byte locations in a SONET frame with data bytes from the data stream.

* * * * *

UNITED STATES PATENT AND TRADEMARK OFFICE
CERTIFICATE OF CORRECTION

PATENT NO.        : 7,894,492 B2  
APPLICATION NO.   : 11/480772  
DATED             : February 22, 2011  
INVENTOR(S)       : Keller Page 1 of 1

It is certified that error appears in the above-identified patent and that said Letters Patent is hereby corrected as shown below:

Title page, under "Assistant Examiner", in Column 2, line 1, delete "B" and insert -- Ba --.

Column 1, line 7, delete "09/918,986," and insert -- 09/918,896, --.

Column 9, line 19, in Claim 16, after "framer;" delete "and".

Signed and Sealed this  
Fifth Day of July, 2011

David J. Kappos  
*Director of the United States Patent and Trademark Office*